United States Patent [19]

Iwakami

[11] 3,806,839

[45] Apr. 23, 1974

[54] VARIABLE LINE EQUALIZER COMPRISING FIRST AND SECOND UNIFORMLY DISTRIBUTED RC NETWORKS

[75] Inventor: Takuya Iwakami, Tokyo, Japan

[73] Assignee: Nippon Electric Company, Limited, Tokyo-to, Japan

[22] Filed: Dec. 12, 1972

[21] Appl. No.: 314,302

[30] Foreign Application Priority Data

Dec. 15, 1971 Japan..........................46-102186

[52] U.S. Cl. ........... 333/28 R, 307/295, 333/70 CR

[51] Int. Cl. ............................................ H03h 7/16

[58] Field of Search............ 333/28 R, 70 CR, 80 T; 307/295, 303

[56] References Cited

UNITED STATES PATENTS 3,444,474 5/1969 Borenstein et al. ........... 333/28 R X 3,212,020 10/1965 Donovan et al. ........... 333/70 CR X 3,345,582 10/1967 Maupin ..................... 333/70 CR X

*Primary Examiner*—Paul L. Gensler

*Attorney, Agent, or Firm*—Sughrue, Rothwell, Mion, Zinn and Macpeak

[57] ABSTRACT

A variable line equalizer comprising a transistor, uniformly distributed RC networks, and variable resistances provides compensation for coaxial line attenuation over a wide band of frequencies. The bandwidth is determined by the values $R_T$, $C_T$ and $R_M$, where $R_T$ and $C_T$ are the total resistance and capacitance of the distributed networks, and $R_M$ is the maximum resistance of the variable resistance.

2 Claims, 4 Drawing Figures

VARIABLE LINE EQUALIZER COMPRISING FIRST AND SECOND UNIFORMLY DISTRIBUTED RC NETWORKS

BACKGROUND OF THE INVENTION

The present invention relates to variable equalizers for use in a wide band coaxial line repeater communication system.

Conventional coaxial line repeater systems employ variable equalizers connected to a part or the whole of the repeaters, for the automatic compensation to a certain extent of the line loss, which depends on variations in the repeater intervals or temperature variations. Various equalizers have been in use for this purpose; typically known is the Bode-type equalizer which consists only of passive circuits using one resistor to serve as the variable element. These equalizers essentially comprise the combination of lumped-constant elements such as resistors, capacitors and inductors (although some kinds of equalizers do not comprise inductors). The equalizers of this type involve drawbacks. For example, an increased number of lumped-constant elements are required if it is desired to obtain better approximation with respect to equalizing characteristics. This is why there have been difficulties in miniaturizing such equalizers. Furthermore, the impedance characteristic which the equalizer exhibits at frequencies above several hundred megahertz is far from what is normally expected, because of the stray capacitance and inductance inherent in the lumped-constant elements.

SUMMARY OF THE INVENTION

In view of the foregoing, a general object of the present invention is to provide a variable line equalizer which is free of the drawbacks of the prior equalizers.

Briefly, the equalizer of the present invention consists essentially of a circuit comprising two uniformly distributed RC networks, two variable resistance elements, and one transistor. This circuit can easily be integrated into miniature configuration to allow the stray impedance to be minimized with the result that the equalizer of this invention can be used at frequencies above several hundred megahertz. In addition, according to the invention, the transfer characteristics can be accurately approximated to the coaxial line loss characteristic over a wide frequency band because the transfer function of the equalizer is given in terms of the first order real rational function with respect to $\sqrt{S}$, as will be described later.

The other objects, features and advantages of the present invention will become apparent from the following description when read in conjunction with the accompanying drawings.

DETAILED DESCRIPTION OF THE INVENTION

Figure 1:
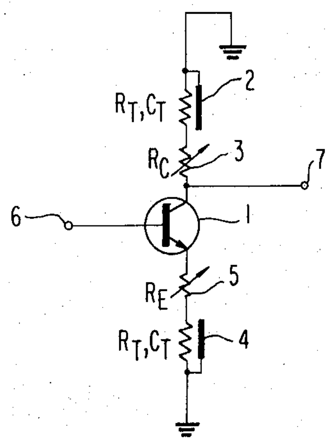
FIG. 1 is a circuit diagram showing a fundamental circuit of the variable line equalizer of the present invention, in which the numeral 1 denotes a transistor; 2 and 4, uniformly distributed RC networks; 3 and 5, variable resistance elements; 6, an input terminal of the circuit; and 7, an output terminal.

Referring to FIG. 1, there is shown a fundamental circuit of the variable line equalizer of the invention, which comprises a transistor 1, a uniformly distributed RC network 2 and a variable resistance element 3 connected in series with each other to serve as the load on the collector side of said transistor, and another uniformly distributed RC network 4 and a variable resistance element 5 connected in series with each other to serve as the load on the emitter side of said transistor. For the simplicity of explanation, the DC circuit is not shown. When the constants of the two RC networks 2 and 4 are suitably chosen, it becomes possible to realize a variable line equalizer capable of accurately compensating for the attenuation characteristics of a coaxial line over a wide band, as will more concretely be described below.

Assuming in FIG. 1, that the uniformly distributed RC networks 2 and 4 are characteristically the same, each network having a total resistance $R_T$ and a total capacitance $C_T$, and that the variable resistance elements 3 and 5 have resistance values $R_C$ and $R_E$, respectively, the load impedance $Z_E$ on the emitter side, and the load impedance $Z_C$ on the collector side are expressed as:

$$Z_E = R_E + R_T/C_T \cdot 1/\ \sqrt{S}\ \tanh\ \sqrt{C_T R_T S} \quad (1)$$

$$Z_C = R_C + R_T/C_T \cdot 1/\ \sqrt{S}\ \tanh\ \sqrt{C_T R_T S} \quad (2)$$

where $S$ represents a complex angular frequency, and the second term of each equation indicates one-terminal pair impedance of the uniformly distributed RC network. It is known that when load impedances $Z_1$ and $Z_2$ are connected, respectively, on the emitter and collector sides of a transistor, then the base-collector voltage transfer function $T(s)$ of the transistor is equal to the ratio $Z_2/Z_1$ on condition that the current amplification factor $\beta$ of the transistor is large enough. Hence, in FIG. 1, the voltage transfer function $T(s)$ between the input terminal 6 and the output terminal 7 will be, $$T(s) = \frac{Z_C}{Z_E} = \frac{R_C + \sqrt{\frac{R_T}{C_T}} \cdot \frac{1}{\sqrt{S}} \tanh \overline{C_T R_T S}}{R_E + \sqrt{\frac{R_T}{C_T}} \cdot \frac{1}{\sqrt{S}} \tanh \sqrt{C_T R_T S}}$$

$$= \frac{1 + \coth \sqrt{C_T R_T S} \cdot \sqrt{\left(\frac{C_T}{R_T} R_C^2\right) S}}{1 + \coth \sqrt{C_T R_T S} \cdot \sqrt{\left(\frac{C_T}{R_T} R_E^2\right) S}} \quad (3)$$

It is assumed here that $S = jw$, where $j^2 = -1$ and $w$ is the angular frequency. A frequency $w_c$ is also defined here as, $$w_c = 1/R_T C_T \quad (4)$$

If the condition $w >> w_c$ exists under this state, $$\coth \sqrt{C_T R_T} \cdot jw \approx 1 \quad (5)$$

Hence Eq. (3) may be rewritten as, $$T(s) \approx \frac{1 + \sqrt{\left(\frac{C_T}{R_T} R_C^2\right) S}}{1 + \sqrt{\left(\frac{C_T}{R_T} R_E^2\right) S}} \quad (6)$$

In other words, the transfer function $T(s)$ becomes a first order function of $\sqrt{S}$.

Eq. (5) holds when $w \geqq 10w_c$, to an error smaller than ±1 percent of absolute value, or when $w \geqq w_c$, to an error smaller than ±10 percent. It is assumed that the amplitude characteristic of Eq. (6), in decibels, is, $$A(w) = 20 \log_{10} T(jw) = A_1(w) - A_2(w) \text{ (dB)} \quad (7)$$

where, $$A_1(w) = 20 \log_{10} \left|1 + \sqrt{[(C_T/R_T)\, R_C^2]\, jw}\right| \quad (8)$$

$$A_2(w) = 20 \log_{10} \left|1 + \sqrt{[(C_T/R_T)\, R_E^2]\, jw}\right| \quad (9)$$

and that the variable range of the resistance of the variable resistance elements are, $0 \leqq R_E \leqq R_M$; $0 \leqq R_C \leqq R_M$, where $R_M$ is the maximum value (10)

Then, the amplitude characteristic $A_M(w)$ is given as, $$A_M(w) = 20 \log_{10} \left|1 + \sqrt{[(C_T/R_T)\, R_M^2]\, jw}\right| \text{ (dB)} \quad (11)$$

where $A_M(w)$ represents $A_1(w)$ when $R_C = R_M$, or $A_2(w)$ when $R_E = R_M$. This amplitude characteristic is shown by the curve 8 in FIG. 2. The curve 9 represents another amplitude characteristic expressed by the following equation, $$C(w) = 5.5 \sqrt{w/w_o} \text{ (dB)} \quad (12)$$

where $$w_o = R_T/C_T R_M 2 \quad (13)$$

Figure 2:
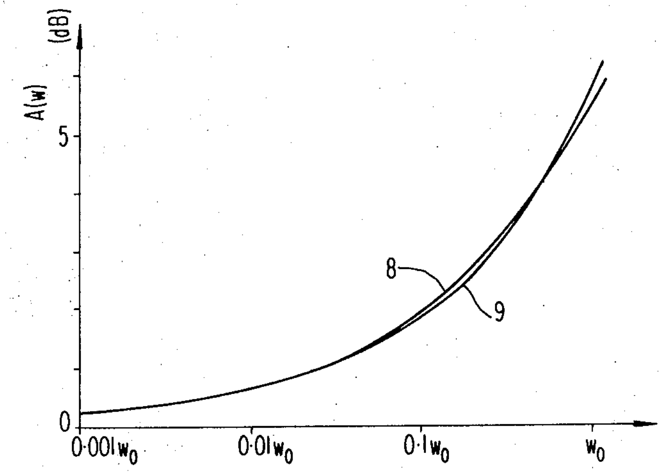
FIG. 2 is a diagram showing the approximation characteristics of the equalizer of the invention, in which the numeral 8 denotes the transfer characteristic of the variable line equalizer; and 9, the $\sqrt{w}$ characteristic approximated by the variable line equalizer.

FIG. 2 evidences the fact that Eq. (11) agrees with Eq. (12) within a deviation of ±0.17 dB, in the angular frequency of, $$0 \leqq w \leqq w_o \quad (14)$$

The characteristic $C(w)$ of Eq. (12) is proportional to the square-root of the frequency used. Namely, $C(w)$ represents the attenuation characteristic of a coaxial line. In other words, $A_M(w)$ of Eq. (11) is accurately approximated to the characteristic of coaxial line loss (5.5 dB at $W_o$) over the range of entire angular frequencies below $W_o$ (Approximation accuracy: within ±0.17 dB). In Eq. (11), when $R_M$ changes to $KR_M$ (where K is a constant in the range of $0 \leqq K \leqq 1$), then the right term of Eq. (11) is reduced to, $$20 \log_{10} \left| 1 + \sqrt{C_T/R_T\, (KR_M)^2\, jw} \right| = 20 \log_{10} \left| 1 + \sqrt{[(C_T/R_T)\, R_M^2]\, j\, (K^2 w)} \right| \quad (15)$$

Figure 3:
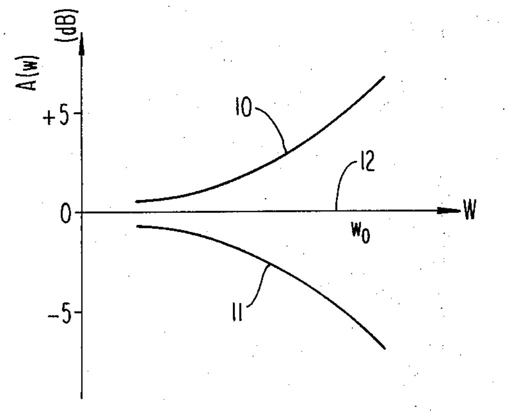
FIG. 3 is a diagram showing the transfer characteristics of the variable line equalizer of the invention which 10, 11 and 12 denote transfer characteristics obtained against different capacitances of the variable capacitance element.

This indicates that the attenuation characteristic is approximated to, $$5.5 \sqrt{K^2 w/w_o} \quad (16)$$

in the angular frequency range, $$0 \leqq w \leqq w_o/K^2 \quad (17)$$

at a deviation within ± 0.17 dB. Since $w_o/K^2 \geqq w_o$, Eq. (17) may be replaced with Eq. (14), Eq. (16) gives the value of $\sqrt{w}$ characteristic which is smaller by a factor of $K$ ($\leqq 1$) than the proportional constant of the $\sqrt{w}$ characteristic of Eq. (12). The fact that the value of K is changed arbitrarily from 0 to 1 means that $R_C$ and $R_E$ are changed arbitrarily from 0 to $R_M$. In other words, $A(w)$ of Eq. (7) is approximated to an arbitrary $\sqrt{w}$ characteristic from $+5.5 \sqrt{w/w_o}$ to $-5.5 \sqrt{w/w_o}$ at a deviation within ± 0.17 dB in angular frequency range of Eq. (14). FIG. 3, shows typical examples of amplitude characteristic $A(w)$ when $R_C$ and $R_E$ are changed. The curve 10 is for the characteristic on condition that $R_C = R_M$ and $R_E = 0$; the curve 11 on condition that $R_C = 0$ and $R_E = R_M$; and the straight line 12 on condition that $R_C = R_E$.

As described above, the variable equalizer of the present invention is simple in circuit construction, yet capable of accurately compensating for variations in the coaxial line loss over a wide frequency band. Because the invention makes it possible to dispense with the need for inductors and simplify the circuit configuration, the equalizer can be integrated into a miniature construction.

Figure 4:
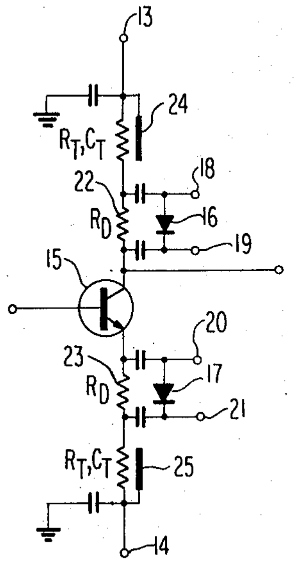
FIG. 4 is a circuit diagram showing a variable line equalizer embodying the invention, in which the numeral 15 denotes a transistor; 16 and 17, diodes used as variable resistance elements; 18 and 19, and 20 and 21 represent terminals from which DC bias current is supplied to the diodes 16 and 17, 22 and 23, fixed resistors for providing the passages of current to the transistor 15; and 24 and 25, uniformly distributed RC networks.

FIG. 4, is a circuit diagram showing an equalizer embodying the present invention, in which the numerals 13 and 14 denote positive and negative power terminals, respectively, from which power is supplied to a transistor 15. The numerals 16 and 17 represent current-controlled variable resistance elements such as PIN diodes, 18, 19, 20, and 21 DC current supply terminals for the diodes 16 and 17, and 22 and 23 fixed resistors for providing the passage of DC current to the transistor 15. These resistors are connected to the diodes 16 and 17 through capacitors. The numerals 24 and 25 denote uniformly distributed RC networks similar to those 2 and 4 shown in FIG. 1. Concrete circuit constants required when designing a variable equalizer with the maximum variable range of ±5.5 dB at 400 MHz will be shown by referring to FIG. 4:

From Eq. (13), $$2\pi \times 400 \times 10^6 = R_T/C_T R_M 2 \quad (18)$$

When the frequency range in which Eq. (5) holds for approximation is above 1 MHz, the following equation is led from Eq. (4).

$$w_C = 2\pi \times 1 \times 10^6 = 1/R_T C_T \quad (19)$$

If the frequency range is below 1 MHz, Eq. (5) does not hold, and $A(w)$ will become slightly different from the determination of Eq. (7). However, the variable width is as small as $\pm 5.5 \times 1/\sqrt{400} = \pm 0.28$ dB, in contrast to $\pm 5.5$ dB at 400 MHz. Hence, even if Eq. (5) does not hold for approximation in the variable frequency range below 1 MHz, this will not appreciably affect the transfer characteristic which approximates to $\sqrt{w}$ characteristic. If $w_c$ of Eq. (6) is determined to be smaller, the influence due to a narrow frequency range can further be reduced. On the other hand, however, the value of $R_T \cdot C_T$ becomes larger, to result in disadvantage with the view to reduce the size of the equalizer. In practice, the value determined by Eq. (19) is desirable. The desired variable equalizer can be realized when the values of $C_T$, $R_T$ and $R_M$ are determined so as to satisfy Eqs. (18) and (19). Because there are three variables against two equations, it is possible to choose the desired one of the three variables. Practically, however, the selection of variable is restrained by the condition of DC supply to the transistor. For example, when the resistance values of the resistors 22 and 23 in FIG. 4 are the same, e.g., $R_D$, then the DC resistances of the circuits on the collector and emitter sides, respectively, will be $(R_T + R_D)$. Therefore, the value of $R_T$ cannot be arbitrarily increased when the voltage supplied to the terminals 13 and 14 is fixed. When the resistance $R_T$ is adequately determined as, $$R_T = 200\Omega \quad (20)$$

then the following equations are derived from Eqs. (18) and (19), $$C_T = 800 \text{ pF} \quad (21)$$

$$R_M = 10\Omega \quad (22)$$

Since $R_M$ is the value of resistance in parallel with the resistance of the diode 16 (or 17) and the resistance of the fixed resistor $R_D$, the maximum resistance value $R'_M$ which the diode 16 (or 17) is to assume is 30Ω if $R_D$ is 15Ω. Namely, $$R'_M = 30\Omega \quad (23)$$

The value of $R_D$ is determined to be suitable according to the range of variable resistance of the diode 16 or 17. Neither diode can have a resistance of 0Ω; the minimum resistance is normally about one to several ohms.

In the practical variable line equalizer, therefore, the variable range is slightly narrower than $\pm 5.5$ dB; it would be about $\pm 5$ dB. When a wider variable range is desired, it is necessary to connect a suitable number of circuits of the invention in cascade. In this case it is not necessary to provide a buffer circuit to insert between individual cascade stages, because the load impedance on the collector side of the transistor 15 in FIG. 4 is as relatively small as 215Ω at DC and becomes smaller as the frequency is higher, as apparent from Eq. (2).

While the principles of the invention have been described in detail in connection with one preferred embodiment, together with specific modifications thereof, it is clearly understood that the invention is not limited thereto or thereby.

What is claimed is:

1. A variable line equalizer for providing compensation for a coaxial line over a frequency band from $W_c$ to $W_o$, comprising:

a. a transistor having base, emitter and collector electrodes, said base electrode serving as an input of said equalizer and said collector serving as an output of said equalizer, b. a first series circuit comprising a first uniformly distributed RC network, a first variable resistance, and said collector electrode connected in series, and c. a second series circuit comprising a second uniformly distributed RC network, a second variable resistance, and said emitter electrode connected in series, wherein the total resistance and capacitance of each said first and second uniformly distributed RC networks is $R_T$ and $C_T$, respectively, and each said first and second variable resistances varies from approximately 0 up to $R_M$, where $R_T$, $C_T$ and $R_M$ satisfy the equations, $W_o = R_T/C_T R_M^2$; and $W_c = 1/R_T C_T$.

2. A variable line equalizer as claimed in claim 1 wherein each of said variable resistances is a PIN diode.

* * * * *

UNITED STATES PATENT OFFICE
CERTIFICATE OF CORRECTION

Patent No. 3,806,839 Dated April 23, 1974

Inventor(s) Takuya Iwakami

It is certified that error appears in the above-identified patent and that said Letters Patent are hereby corrected as shown below:

IN THE SPECIFICATION:

Column 2, line 39 - before "each" insert -- with -- line 64 - delete "$\overline{C_T R_T S}$" and insert -- $\sqrt{C_T R_T S}$ --

Column 3, line 45 - "(10)" should be at right margin of column and in smaller type face -- line 58 - delete $R_M 2$ and insert -- $R_M^{\ 2}$ --

Column 4, line 58 - delete $R_M 2$ and insert -- $R_M^{\ 2}$

Signed and sealed this 22nd day of October 1974.

(SEAL)
Attest:

McCOY M. GIBSON JR.
Attesting Officer

C. MARSHALL DANN
Commissioner of Patents